(12) United States Patent
Cavanaugh et al.

(10) Patent No.: US 7,009,680 B2
(45) Date of Patent: *Mar. 7, 2006

(54) NARROW BAND TUNABLE FILTER WITH INTEGRATED DETECTOR

(75) Inventors: Shanti A. Cavanaugh, Santa Rosa, CA (US); Gary M. Zalewski, Oakland, CA (US)

(73) Assignee: Xtellus Inc., Morris Plains, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 74 days.

(21) Appl. No.: 10/453,455

(22) Filed: Jun. 2, 2003

(65) Prior Publication Data

US 2004/0239869 A1 Dec. 2, 2004

(51) Int. Cl.
*G02F 1/1339* (2006.01)

(52) U.S. Cl. ............... 349/196; 349/201; 349/202; 349/18

(58) Field of Classification Search ............ 349/196, 349/18, 201–202; 359/486–487, 496–498
See application file for complete search history.

(56) References Cited

U.S. PATENT DOCUMENTS

| | | |
|---|---|---|
| 4,135,789 A | 1/1979 | Hall |
| 4,148,128 A | 4/1979 | Feldman |
| 4,165,157 A | 8/1979 | Kobale |
| 4,310,220 A | 1/1982 | Kuwagaki |
| 4,315,668 A | 2/1982 | Aftergut |
| 4,410,238 A | 10/1983 | Hanson |
| 4,545,650 A | 10/1985 | Kirkman |
| 4,556,289 A | 12/1985 | Fergason |
| 4,634,225 A | 1/1987 | Haim |
| 5,013,140 A | 5/1991 | Healey |
| 5,015,057 A | 5/1991 | Rumbaugh |
| 5,088,806 A | 2/1992 | McCartney |
| 5,276,747 A | 1/1994 | Pan |
| 5,414,541 A | 5/1995 | Patel |
| 5,430,561 A | 7/1995 | Kato |
| 5,515,461 A * | 5/1996 | Deri et al. ............ 385/30 |
| 5,724,165 A | 3/1998 | Wu |
| 5,726,805 A | 3/1998 | Kauskik |
| 5,727,109 A | 3/1998 | Pan |
| 5,859,728 A | 1/1999 | Colin |
| 5,953,087 A | 9/1999 | Hoyt |
| 5,963,291 A | 10/1999 | Wu |
| 6,075,512 A | 6/2000 | Patel |
| 6,094,246 A | 7/2000 | Wong |

(Continued)

*Primary Examiner*—Dung T. Nguyen
*Assistant Examiner*—Phu Vu
(74) *Attorney, Agent, or Firm*—Morrison & Foerster LLP

(57) ABSTRACT

A polarization insensitive narrowband tunable filter utilizes an active liquid crystal cell to change the index of refraction and tuning of a waveguide resonant filter employing a nanostructured waveguide grating and polarization beam splitters to independently channel and convert S- and P-polarization states into optically and geometrically parallel beams which pass through the device. A multi-pixel configuration offers extended tuning range by employing a 1×N optical switch or splitter and N tunable pixel-filters each having offset center frequency enabling the tuning range of one pixel to partially overlap another pixel rendering the device and 1×N switch or splitter capable of scanning pixels to yield an expanded continuous tuning range mode. Optional features of the present invention include deposited photodetectors, deposited metal gasket moisture barrier, deposited spacer layer with high cell gap tolerance, a deposited thermal sensor and heater and related temperature compensation control schemes.

23 Claims, 18 Drawing Sheets

U.S. PATENT DOCUMENTS

| | | | |
|---|---|---|---|
| 6,141,076 A | 10/2000 | Liu |
| 6,141,361 A | 10/2000 | Mears |
| 6,166,838 A | 12/2000 | Liu |
| 6,181,846 B1 | 1/2001 | Pan |
| 6,201,593 B1 | 3/2001 | Wong |
| 6,215,928 B1 | 4/2001 | Friesem |
| 6,253,015 B1 | 6/2001 | Ukrainczyk |
| 6,285,478 B1 | 9/2001 | Liu |
| 6,353,467 B1 | 3/2002 | Wong |
| 6,356,389 B1 | 3/2002 | Nilsen |
| 6,388,730 B1 | 5/2002 | Lindquist |
| 6,404,538 B1 | 6/2002 | Chen |
| 6,426,816 B1 | 7/2002 | Wu |
| 6,429,962 B1 | 8/2002 | Xu |
| 6,455,841 B1 | 9/2002 | Zhou |
| 6,498,680 B1 | 12/2002 | Zhou |
| 6,519,022 B1 | 2/2003 | Xu |
| 6,603,781 B1 | 8/2003 | Stinson |
| 6,621,580 B1 | 9/2003 | Myatt |
| 2003/0201966 A1 | 10/2003 | Pan |

* cited by examiner

117

NARROW BAND TUNABLE FILTER WITH INTEGRATED DETECTOR

CROSS-REFERENCE TO RELATED APPLICATIONS

This application is a continuation of and claims priority from commonly assigned application, Ser. No. "Liquid Crystal Optical Processing Systems", filed Mar. 19, 2003.

FIELD OF INVENTION

This invention generally relates to electrically tunable optical filters. More specifically, this invention relates to a polarization independent liquid crystal narrowband tunable filter with wide tuning range and integrated photodetector.

BACKGROUND OF THE INVENTION

Since the advent of fiber optics, the fiber optical communication infrastructures have become more diverse and sophisticated. The fiber optic applications range from low speed, local area networks to high speed, long distance telecommunication systems. In recent years, the demands for greater bandwidth and lower network costs have resulted in increasing use of dynamic, tunable components.

Tunable optical filters are of particular importance because they can be configured to perform a variety of critical network functions, including channel selection and optical power monitoring.

Prior art techniques to construct tunable optical filters include the acousto-optic tunable filter which operates by using an acoustic wave simulated by a radio-frequency power supply and transducer to induce densification and rarefaction in an optical waveguide material. In practice, acoustic-optic tunable filters usually work by changing the polarization of light at a wavelength that is matched to the acoustically induced grating which results in separation of tuned wavelength from the other wavelength components. Tuning is accomplished by changing the frequency of the applied acoustic wave. Acoustic-optic devices provide rapid tuning in the microsecond range and complete blanking of the filter, however they are not polarization independent devices and suffer from poor adjacent channel rejection and high insertion loss.

Optical nanostructures have been the object of scientific investigation for several years but advances in material science and imprint lithography have only recently resulted in their cost effective manufacturing and availability. An optical nanostructure is derived with feature sizes below the wavelength of light, so they offer uniform behavior over a broad wavelength, wide acceptance angles and unique optical properties by function of varying dimensions of the underlying grating features. Most recently, optical nanostructures have been designed to function as a resonant waveguide, which, when coupled to an active layer capable of changing its index of refraction, is a foundation for tomorrows tunable waveguide filter.

Liquid crystals are known to change their index of refraction with the application of voltage and can be dynamically controlled and configured to enable a range of optical switching and signal conditioning applications. Formed with opposing plates of sealed substrates, liquid crystal cells are considered a prospect technology and integration target capable of supplying the active layer to a nanostructure integrated therewith. Wang et. Al has recently demonstrated an experimental electrically tunable filter based on a waveguide resonant sub-wavelength nanostructure-grating filter incorporating a tuning mechanism in a thin liquid crystal. The device experiment was functional and exhibited performance of 30 nanometer tuning, however this device i) does not function in a polarization independent capacity; ii) does not offer a wide tuning range required for operation in different network bands, and; iii) does not address temperature stability issues associated with robust control of liquid crystal devices.

The advantages of liquid crystal based tunable filter over existing technologies include durability due to the absence of mechanical moving parts, no stretchable medium required as in prior art tunable filters and derivatives, no loss of optical performance in the event of mechanical failure, no fatigue resulting from mechanical failure occurring over time and the ability to provide tunable filter arrays with multiple tuning pixels.

Given the assertion that tunable devices can be achieved at low cost by way of integrating active liquid crystal with passive integrated nanostructured gratings, the present invention addresses a strong need for a low cost polarization independent tunable filter that offers a wide tuning range that operates in a reliable manner across a range of temperature and atmospheres.

The present invention tunable filter utilizes active liquid crystal in conjunction with passive optical elements to vary the index of refraction of the media. A change in index of refraction creates different waveguide conditions and affects the incident light propagation in the media. Wavelength tuning is achieved from the liquid crystal material's ability to change the index of refraction as a function of an external electrical field.

FEATURES OF THE INVENTION

The present invention contains several features and embodiments that may be configured independently or in combination with other features of the present invention, depending on the application and operating configurations. The delineation of such features is not meant to limit the scope of the invention but merely to outline certain specific features as they relate to the present invention.

It is a feature of the present invention to provide a tunable filter that produces a narrowband output.

It is a feature of the present invention to provide a tunable filter that may be configured with an integrated photodetector to enable optical power monitoring applications.

It is a feature of the present invention to provide a tunable filter that offers low insertion loss.

It is a feature of the present invention to provide a tunable filter architecture that may be configured with a scalable and expansive tuning range.

It is a feature of the present invention to provide a tunable filter that may be configured to operate in a polarization independent manner.

It is a feature of the present invention to provide a tunable filter that may utilize a nanostructured waveguide grating in conjunction with a liquid crystal tuning mechanism and where the grating may act as the liquid crystal anchoring layer.

It is a feature of the present invention to provide liquid crystal tunable filter that may be constructed from materials substantially impervious to moisture.

It is a feature of the present invention to provide liquid crystal tunable filter that may contain a heater and temperature sensor integrated therein as single physical element and to provide for accurate and uniform control of heating and temperature sensing.

It is a feature of the present invention to provide a novel method of operating liquid crystal tunable filter across a range of temperature without the need for lookup tables otherwise used to compensate for real time temperature changes.

It is a feature of the present invention to provide a liquid crystal tunable filter that pass the strict telecommunications guidelines as outlined in Telcordia GR1221 without the need for hermetic housing.

It is a feature of the present invention to provide liquid crystal tunable filter that is not prone to warpage when exposed to various thermal and humidity atmospheres.

SUMMARY OF THE INVENTION

The disadvantages associated with the prior art may be overcome by a liquid crystal tunable filter that utilizes active liquid crystal to tune a waveguide resonant grating filter in an architecture whereby polarization beam splitters and rotating mirrors separate and convert S- and P-polarization states into optically and geometrically parallel beams. The tunable filter may be configured with an extended tuning range by employing a 1×N optical switch or splitter and N tunable pixel-filters, where N is an integer greater than one and where each pixel is a tunable filter having an offset center frequency enabling the tuning range of one pixel to partially overlap another pixel rendering the device and 1×N switch capable of scanning pixels to yield an expanded continuous tuning range mode. The device may also employ, respectively, an optional deposited photodetector, deposited metal gasket moisture barrier bonding two opposing substrates each having a spacer layer to accurately control cell gap thickness; and, an integrated thermal sensor and heater deposition layer sandwiched between or deposited on at least one or both opposing substrates of the tunable filter.

The disadvantages associated with the prior art may further be overcome with control system utilizing a time division scheme that multiplexes temperature sensing and heating functions across an integrated active thermal element in the tunable filter, such that the device may generally be kept at a constant temperature. In addition or in place of heating the device, a calibration process characterizes the profile of the device and generates a polynomial regression formula that provides the voltage drive output the platform based on the platform temperature and state of each pixel. The control system stores the state of the liquid crystal tunable filter, the regression formula, and reads the temperature of the device to compute and assert the temperature compensated voltage drive across the device.

DETAILED DESCRIPTION

Throughout this application, like reference numbers as used to refer to like elements. For instance, the two substrates used to form the liquid crystal cell of the present invention are referred to throughout this applications as 110A and 110B. Those supporting elements and features of the invention that are distributed on each substrate and later combined may be referred to under their index reference for a particular substrate 'A, 'B or for simplicity sake, under the shared reference '.

Figure 1A:
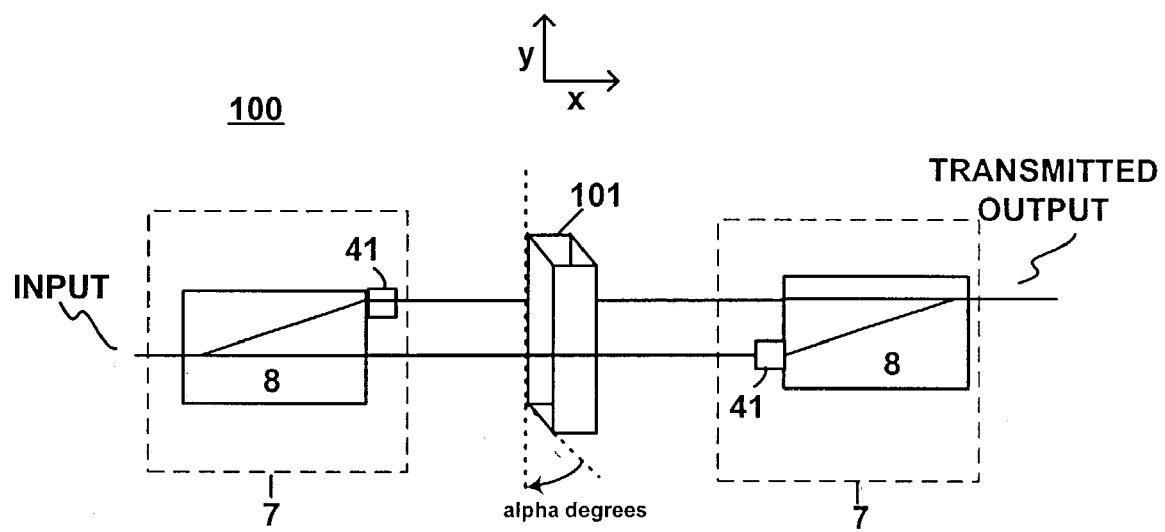
FIG. 1A shows a first embodiment polarization independent tunable filter utilizing birefringent walk off crystals and half wave plates to establish two reference inputs to a liquid crystal tunable filter.

A first embodiment of the present invention is presented in FIG. 1A, which shows a tunable filter 100 comprised of an input bi-directional optical polarization splitter/combiner 7 capable of accepting an input beam having any polarization and producing two substantially parallel output beams having the same polarization, a liquid crystal tunable filter pixel 101 having an input coupled to the output of the splitter/combiner that accepts the two beams and produces a reflected output passband as well as a passthrough complimentary transmission output beam for each input beam, and lastly, an output splitter/combiner 7 having an input that receives the output parallel passthrough transmission beams from the tunable pixel filter and produces a single output beam in response thereto. In this embodiment, the bi-directional optical splitter/combiners 7 may be comprised of a birefringent walk-off crystal 8 and half wave plate 41. When used on the input side of the first embodiment tunable filter of FIG. 1A, the birefringent crystal 8 accepts the input beam and separates it into two parallel paths each having orthogonal polarizations. The half wave plate 41 establishes parallel polarization from the two beams exiting the splitter/combiner 7. When used on the output side of the first embodiment tunable filter of FIG. 1A, one of the two parallel beams pass through the half waveplate to establish orthogonal polarization of the two beams such that when they pass through the birefringent crystal, the birefringent effect takes place and the beams converge at the output of the crystal.

With respect to FIG. 1A and the best mode of carrying out this embodiment of the present invention, the tunable filter pixel 101 may be positioned anywhere from a >0 to 10 degree offset angle (alpha) Z-X plane to accommodate the preferred resonance mode and reflection path, however it is preferred that this angle be substantially 1 degree so that the reflected beam is decoupled from the incident beam but a liquid crystal and polyimide with reasonable pre-tilt can still be used.

The passband output produced by the tunable filter pixel 101 (not shown) overlaps the input path in the X-Z plane and deviates in the Y direction by an angle of 2*alpha.

Figure 1B:
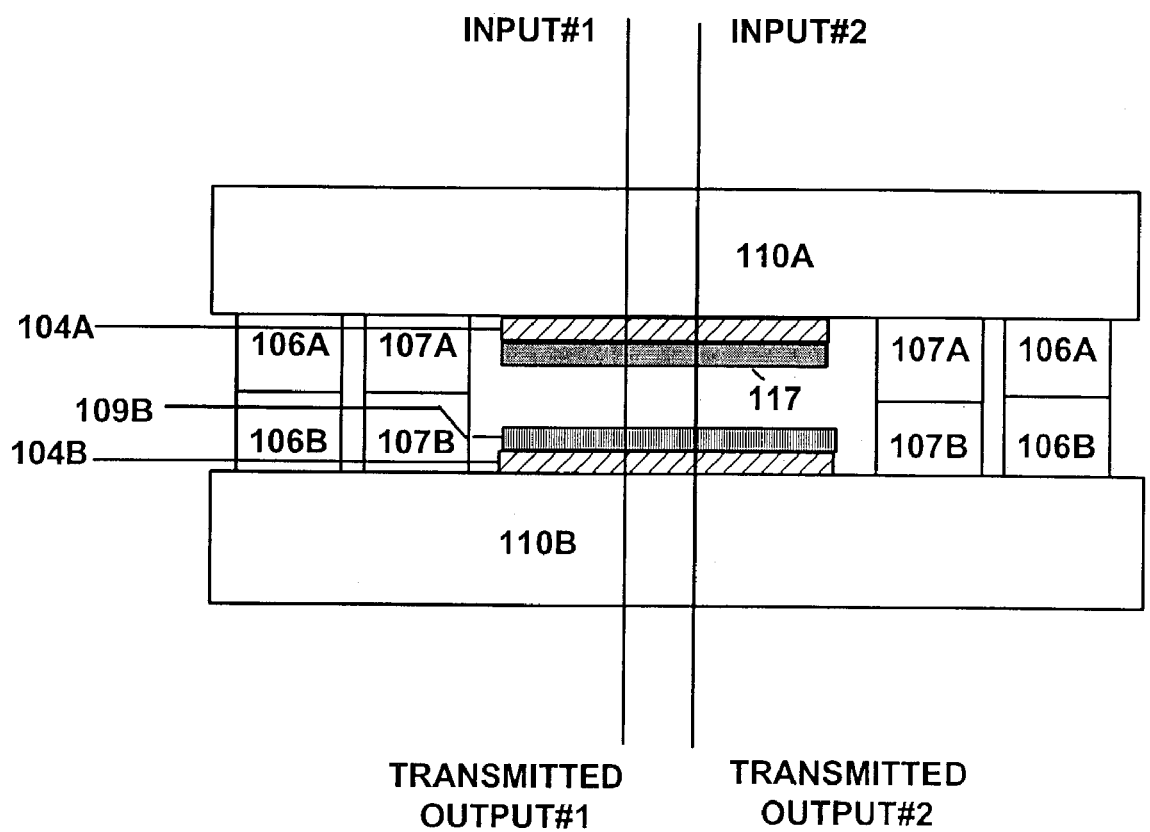
FIG. 1B shows the detailed liquid crystal tunable filter used in FIG. 1A.
Figure 1B:
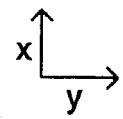

FIG. 1B shows a detailed configuration of a preferred liquid crystal tunable filter 101 that may be used in the first embodiment of the present invention. With respect to FIG. 1B, the liquid crystal tunable filter 101 may be comprised of a first substrate 110A and a second substrate 110B. It is essential that the first substrate has a layer stack in the aperture comprised of an electrode layer 104A and waveguide resonant grating filter 117. It is preferred that the present invention includes outside the aperture, a liquid crystal cell spacer layer 107A and a metal gasket layer 106A. The second substrate 110B may contain an essential layer stack in the aperture comprised of an electrode layer 104B and a liquid crystal anchor layer 109B. It is preferred that the present invention includes a liquid crystal cell spacer layer 107B and a metal gasket layer 106B outside the aperture. As shown in FIG. 1B and as will be described further in the fabrication process of the present invention, the best mode of coupling the two substrates requires that the metal gasket 106 and spacer layers 107 on each substrate are coupled in opposition to each other to facilitate a bond between the two metal gasket layers to form a metal gasket seal 106 around the cell.

A slight modification of the first embodiment of the present invention and herein included as part of the present invention is a configuration where the output bi-directional optical splitter/combiner 7 is eliminated and where one or more photodetector(s) capable of receiving the two transmitted and/or reflected output beams is coupled to the tunable pixel element 101.

Figure 1C:
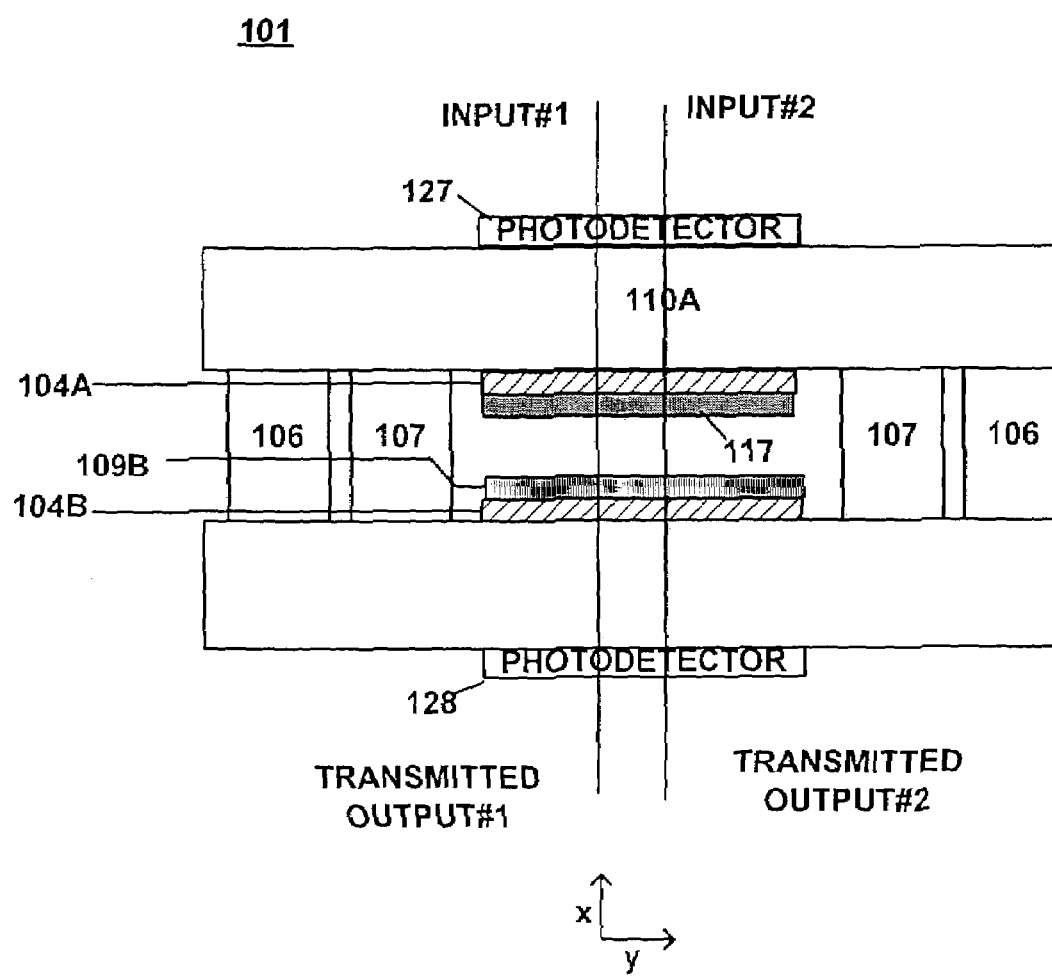
FIG. 1C shows the detailed liquid crystal tunable filter used in FIG. 1A with an optional integrated photodetector which may be used to capture all or tap a fixed percentage of the dual transmitted output.

Another slight modification of the first embodiment of the present invention and herein included as part of the present invention, is a configuration where the output bi-directional optical splitter/combiner 7 is maintained but a one or more partially transparent photodetector(s) capable of tapping the two transmitted and/or the two reflected passband output beams is coupled to the tunable filter pixel 101, as shown in FIG. 1C.

Figure 1D:
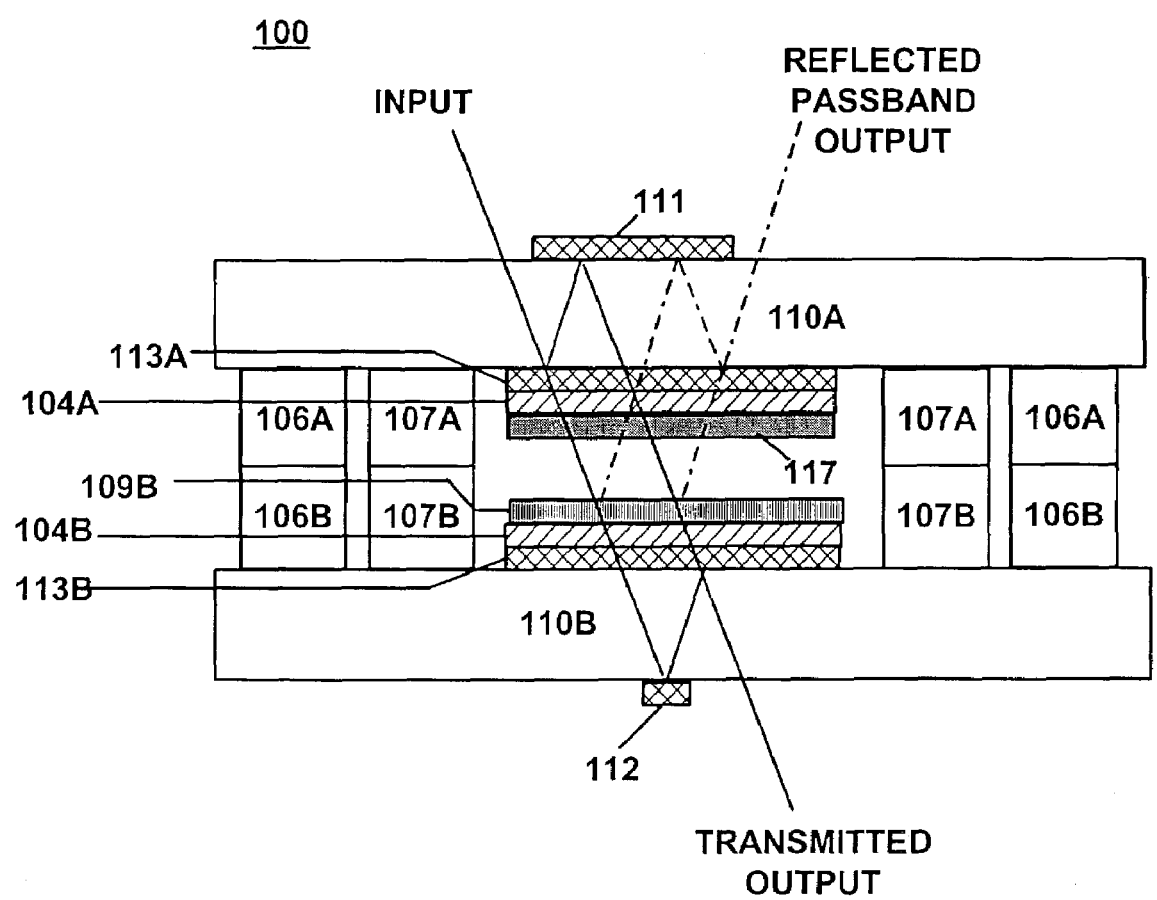
FIG. 1D shows a second embodiment polarization independent tunable filter pixel element in the X-Y plane that utilizes integrated polarization beam splitters to establish a two path pass through the filter and combine the outputs into single transmitted and reflected beams.
Figure 1D:
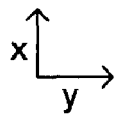

A second preferred embodiment of the present invention operates on the same principals as the first embodiment of the present invention but it utilizes integrated polarization beam splitters and combiner optical elements along with quarter wave rotating mirrors to establish two parallel paths through a liquid crystal cell with a waveguide grating integrated therein. More specifically, FIG. 1D shows a polarization independent tunable filter pixel element 100 having a first substrate 110A in opposition to a second substrate 110B. In this embodiment, the first substrate has, in the aperture, an essential inner surface layer stack comprising a polarization beam splitter 113, a conductive electrode 104 and waveguide resonant grating filter 117. As shown in FIG. 1D, on the outer surface of the first substrate and in the aperture is a patterned quarter wave rotating optical element 111. A quarter wave optical reflector will rotate the beam by one quarter wave as it enters and by one quarter wave as it exists the optical element 111 such that the total beam rotation is one half wave after reflection. As so, both beams passing through the liquid crystal waveguide 117 have the same polarization states. Outside the aperture on the inner surface of the first substrate is a non essential metal gasket seal layer 106A and thin film spacer layer 107A. In this embodiment, the second substrate 110B has, in the aperture, an essential inner layer stack comprising a polarization beam splitter 113B, a conductive electrode layer 104B and a liquid crystal alignment layer 109B. On the outer surface of the first substrate and in the aperture is an patterned quarter wave rotating optical element 112. The optical beam will be rotated by one quarter wave as it enters and by one quarter wave as it exists the optical element 112 such that the total beam rotation is one half wave after reflection such that the output beam reflecting off of the polarization beam spitter/combiner 113B is orthogonal to its counter part passing through the splitter 113B and combining therewith to form the polarization maintained transmitted output beam.

As shown in FIG. 1, outside of the aperture on the inside surface of the second substrate is an optional metal gasket seal layer 106B and spacer layer 107B. Liquid crystal molecules disposed in the aperture between the substrates 110A and 110B may be held in place by the metal gasket seal 106.

Figure 1E:
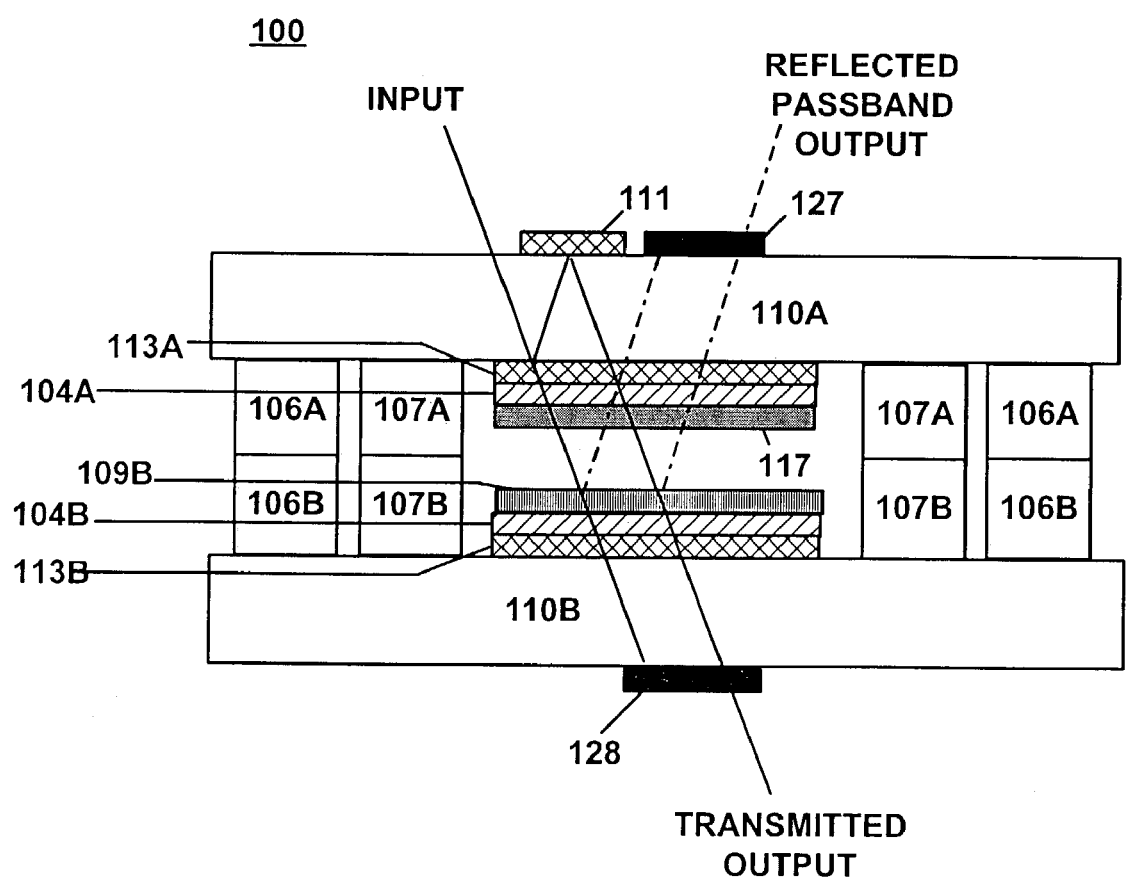
FIG. 1E shows a second embodiment polarization independent tunable filter pixel element in the X-Y plane that utilizes integrated a polarization beam splitter to establish a two path pass through the filter and integrated photodetectors to capture all of tap a fixed percentage of the dual transmitted and reflected output beams.

A slight modification of the second embodiment of the present invention utilizes integrated photodetectors to convert the photonic output of the tunable filter into an electrical signal. More specifically, a single photodetector may be used to capture the output of the paired parallel transmission beams and presented in FIG. 1E. Alternately, a single photodetector may be used to capture the output of the reflected passband output and is as also shown in FIG. 1E. With respect to FIG. 1E, a polarization independent tunable filter pixel element 100 has a first substrate 110A in opposition to a second substrate 110B. In this embodiment, the first substrate has, in the aperture, an essential inner surface layer stack comprising a polarization beam splitter 113, a conductive electrode 104 and waveguide resonant grating filter 117. As shown in FIG. 1E, on the outer surface of the first substrate and in the aperture is a patterned quarter wave rotating optical element 111. A quarter wave optical reflector will rotate the beam by one quarter wave as it enters and by one quarter wave as it exists the optical element 111 such that the total beam rotation is one half wave after reflection. As so, both beams passing through the liquid crystal waveguide 117 have the same polarization states. Outside the aperture on the inner surface of the first substrate is an optional metal gasket seal layer 106A and thin film spacer layer 107A. The second substrate 110B has an essential inner layer stack in the aperture comprising a polarization beam splitter 113B, a conductive electrode layer 104B and a liquid crystal alignment layer 109B. On the outer surface of the second substrate and in the aperture is a photodetector element 128 that captures both polarization beam paths. As shown in FIG. 1E, outside of the aperture on the inside surface of the second substrate is an optional metal gasket seal layer 106B and spacer layer 107B. Liquid crystal molecules disposed in the aperture between the substrates 110A and 110B may be held in place by the metal gasket seal 106.

All embodiments of the liquid crystal tunable filter pixel described herein can be configured to produce two outputs: a reflected passband output and a transmitted output. The reflected passband output is a Lorenzian shaped narrowband profile while the transmitted output is the compliment of the passband output. In general, the input signal passes through the aperature of the cell and the passband output is reflected off the waveguide structure 117 (shown by way of dotted line). An input angle, alpha, defines the optical path of the reflected passband output. Changes in this angle require a change in the grating period and/or waveguide material in order to maintain optimization over the same wavelength range. The reflected passband output has 2*alpha degrees of separation from the input beam and converges at the waveguide 117. The transmitted output beam is a continuation of the input beam minus the reflected passband output.

It is preferred that the second embodiment utilizes an alpha angle of 10 degrees to satisfy the optical path constraints implied by optical polarization beam splitter and combiner elements 111 and 112, respectively.

An important feature of the present invention is an integrated photodetector which may be placed at the reflected passband output and/or the transmitted output of the tunable filter.

Figure 1F:
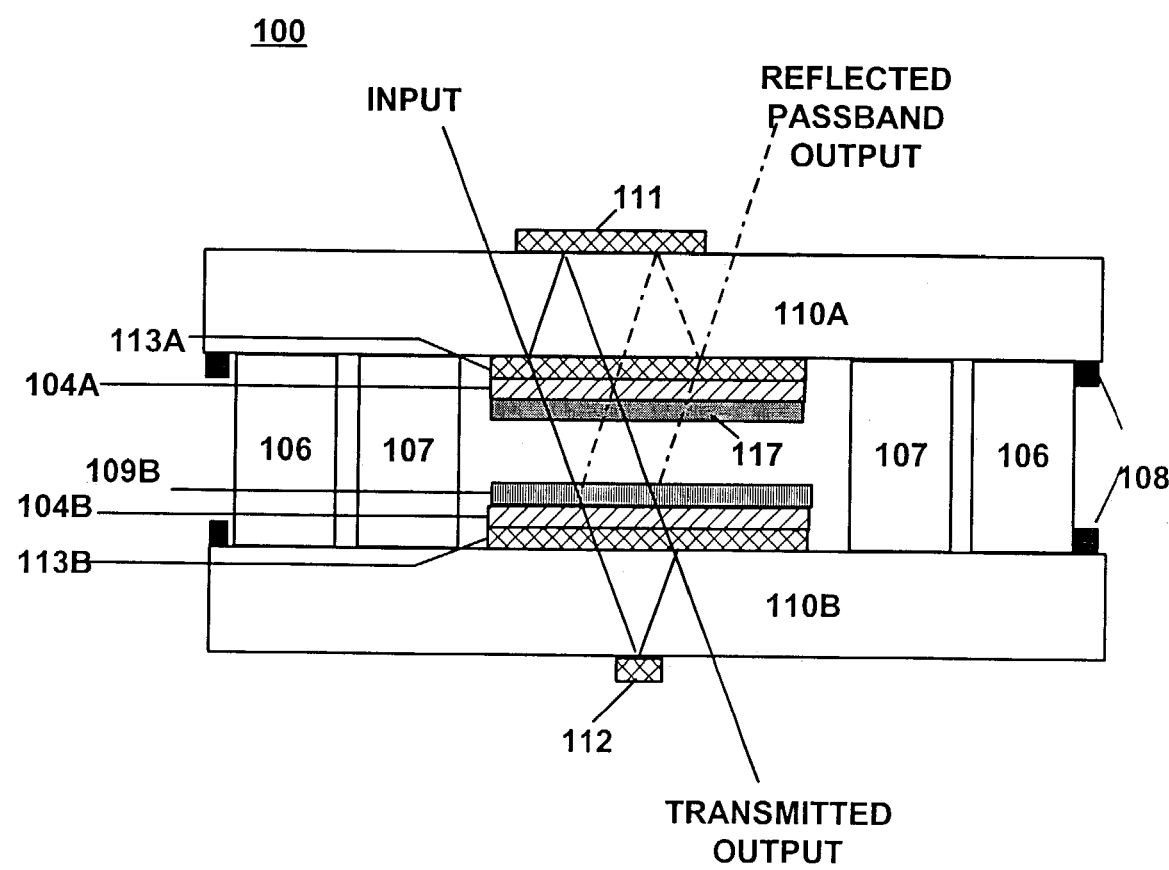
FIG. 1F shows a temperature sensor and heating device that may be integrated with any embodiment of the present invention.

All liquid crystal cell embodiments of the present invention may be configured with a resistive heater and temperature sensor feature 108. FIG. 1F shows a polarization independent tunable filter pixel element 100 having a first substrate 110A in opposition to a second substrate 110B. In this embodiment, the first substrate has, in the aperture, an inner surface thin film layer stack comprising a polarization beam splitter 113, a conductive electrode 104 layer and waveguide resonant grating filter 117. As shown in FIG. 1F, on the outer surface of the first substrate and in the aperture is a patterned quarter wave rotating optical element 111. Outside the aperture on the inner surface of the first substrate is an optional metal gasket seal layer 106A, thin film spacer layer 107A and heater/temperature sensor element 108. In this embodiment, the second substrate 110B has, in the aperture, an inner layer stack comprising a polarization beam splitter 113B, a conductive electrode layer 104B and a liquid crystal alignment layer 109B. On the outer surface of the first substrate and in the aperture is a patterned quarter wave rotating optical element 112. As shown in FIG. 1G, outside of the aperture on the inside surface of the second substrate is an optional metal gasket seal layer 106B, spacer layer 107B and heater/temperature sensor element 108. Liquid crystal molecules disposed in the aperture between the substrates 110A and 110B may be held in place by the metal gasket seal 106.

Figure 2:
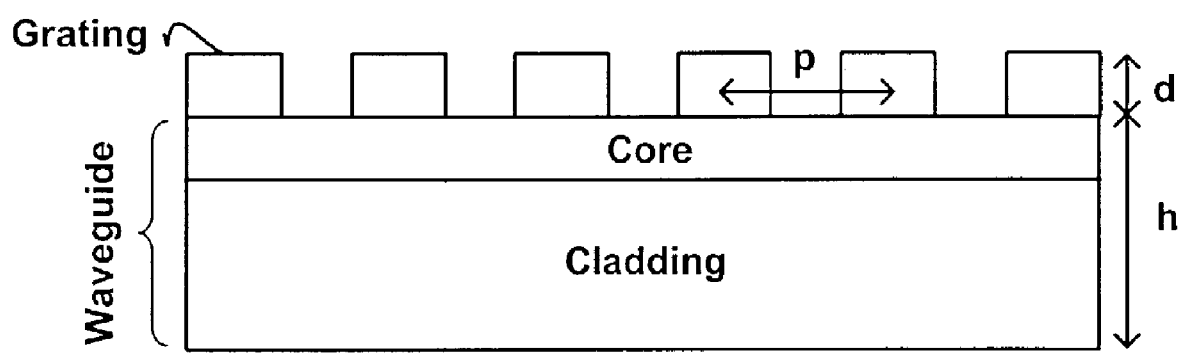
FIG. 2 shows an example waveguide grating optical filter of the present invention.

An important component to the tunable filters 100 and 101 is the waveguide resonant waveguide grating filter 117, shown in FIG. 2. The grating filter 117 consists of gratings on planar waveguide that are nominally transparent to an incident plane wave away from the resonance condition but reflect the externally incident plane wave at the resonance condition. Tuning the filter element 100 is achieved by application of a voltage across the conductive electrode layers 104A and 104B, which imputes a change in index of refraction and resonant wavelength of the waveguide structure according to the phase condition for propagation of a guided mode satisfied by:

$$2k_2h + 2\phi_{12} + 2\phi_{23} = 2m\pi$$

where m is the mode number, k2 is the wave vector of light in the x direction in the waveguide, h is the waveguide thickness and $\phi_{12}$ and $\phi_{23}$ are the two Fresnel phases due to the waveguide interface internal reflections.

The grating on top of the waveguide 117 implies a grating vector that may be represented as:

$$K = 2\pi/\Lambda$$

where $\Lambda$ is the grating period and the value of the grating vector K is approximately the same as that of the mode propagation constant in the z direction, $\beta$, which is $$\beta^2 = \epsilon_2 k_0^2 - k_2^2,$$

where $k_0$ is the wave vector of the incident wave, k2 is the wave vector of light in the x direction in the waveguide, and $\epsilon_2$ is the dielectric constant in the waveguide. As so, the total destructive interference at resonance will obtain a total output transmitted field E, given by $$E = S_t E_0 + \exp(-i\pi) \frac{S\exp(i\Delta)}{1 - |1 - S|\exp(i\Delta)} E_0$$

Where St is the diffraction coefficient that relates the incident wave to the wave initially transmitted through the waveguide, $\Delta$ is the dephasing introduced by a deviation of the wavelength or incident angle at the resonance condition, i is the incident wave, E0 is the energy transmitted away from resonance, and s is the diffraction coefficient relating the physical parameters of the waveguide grating (the Fresnel phase of waveguide interface, the dielectric constant difference in the grating region, the wave vector of the incident wave, the $1^{st}$ order Fourier components of the modulated dielectric constant of the grating, the depth of the grating surface relief, and the wave vectors in the liquid crystal and waveguide regions).

Figure 3:
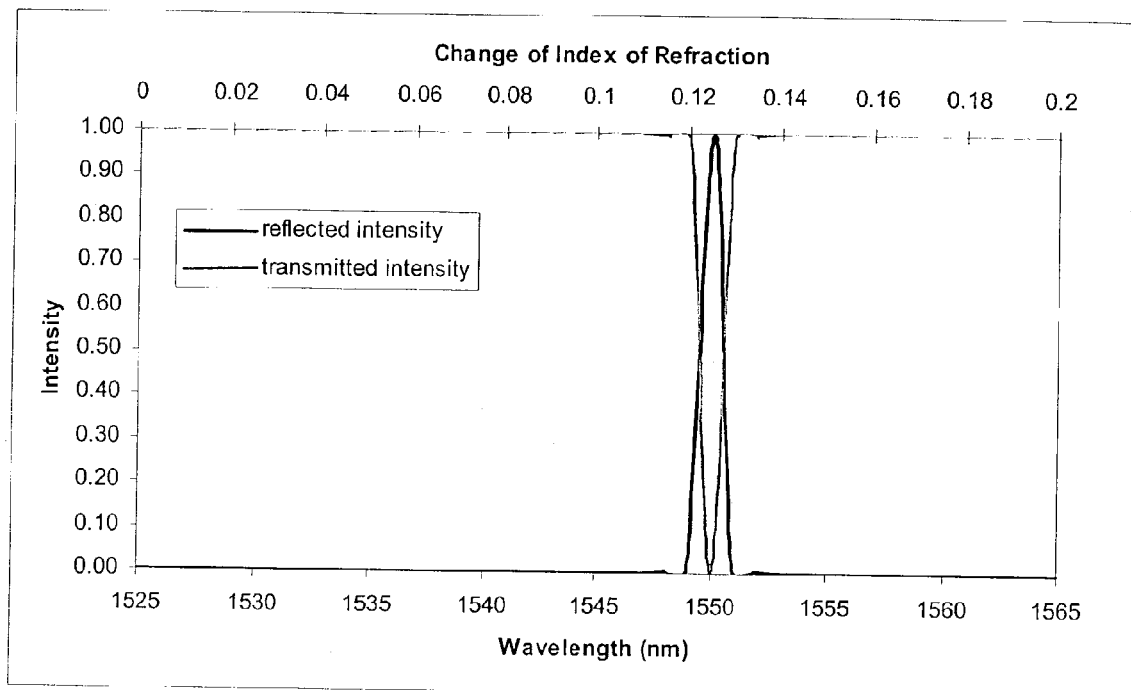
FIG. 3 shows an example tunable filter passband output profile as a function of index of refraction.

The waveguide grating filter may comprise a grating and waveguide. The grating may be formed of silicon nitride. The grating period, P, may be 200 to 900 nanometers depending on the frequency of operation, however it is preferred for telecommunications frequency applications in the C and L bands, that the period of the grating be 450 nanometers and depth, D, approximately 220 nanometers. The grating may be sourced from NanoOpto Inc. of Somerset New Jersey or formed by way of nano-imprint lithography or similar lithography processes as generally understood in the art or herein described. The waveguide may comprise a silicon nitride core approximately 480 nanometers thick and a silicon dioxide cladding approximately 1.5 microns thick. While the index of refraction of the waveguide may be 2.3 to 3.05, it is preferred that the index of refraction be 2.95. The waveguide may also be sourced from NanoOpto Inc. of Somerset New Jersey or formed by way of thin film deposition as generally understood in the art. FIG. 3 shows the reflected passband and transition waveforms based on the aforementioned parameters.

Based on the model above, the tuning range of the liquid crystal tunable filter pixel of the present invention may exceed 100 nanometers.

Figure 4:
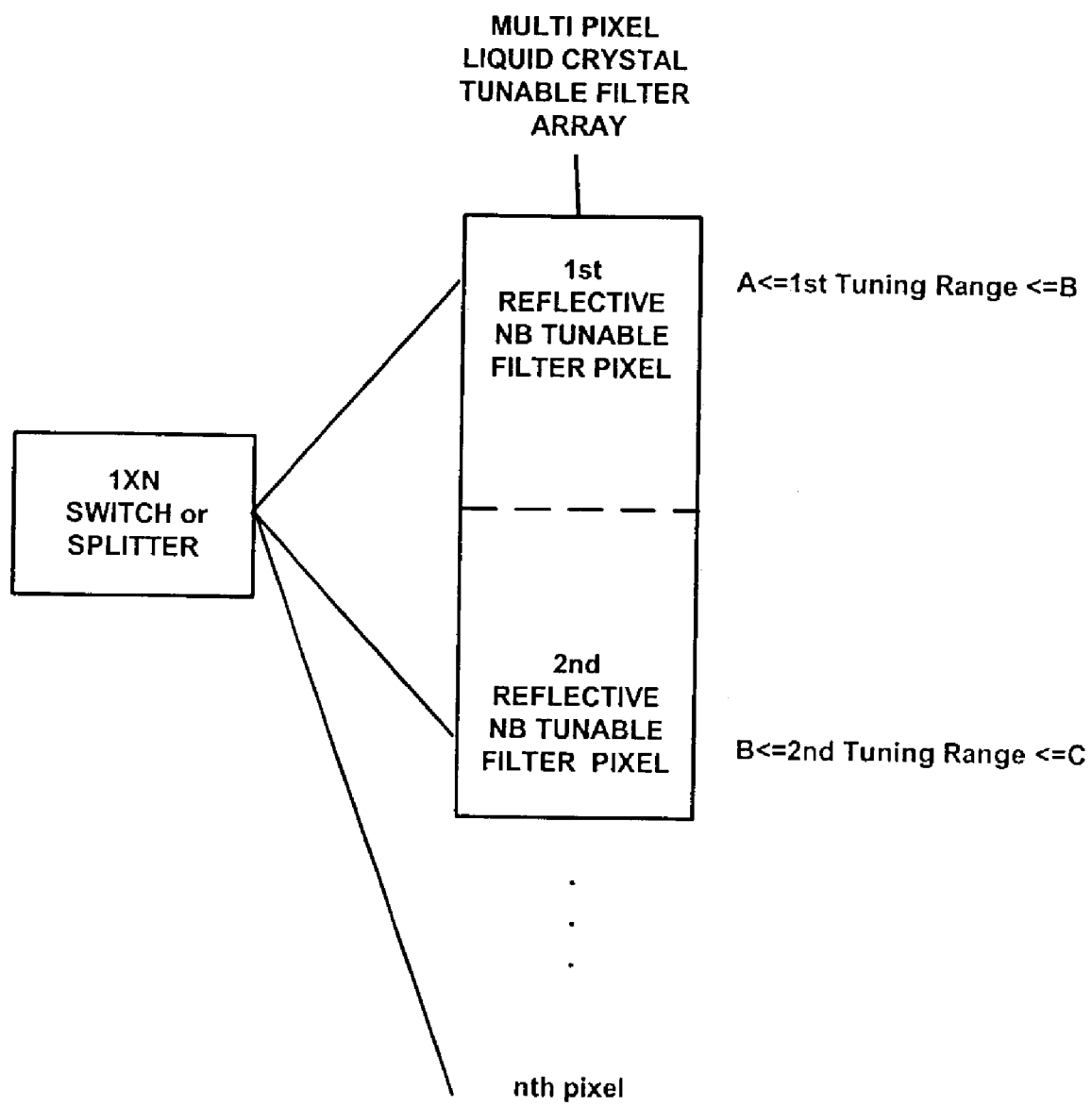
FIG. 4 shows an example two-pixel tunable filter optical power monitor architecture having a tuning range substantially doubled over the range of any single pixel tuning element.

A third embodiment of the present invention is shown in FIG. 4, in which a multi-pixel tunable filter array disposed in a parallel configuration are used along with a passive splitter or active optical switch to route an input beam onto the plurality of tunable filter pixels. In this embodiment, the tunable filters are formed with partially overlapping tuning ranges. The tunable filter array having overlapping tuning ranges may be fabricated by way of masking unique physical parameters for each tunable filter waveguide element in a master mask. It is preferred that the tuning ranges partially overlap to enable flexibility and tolerance in timing routines in the electronic control system (which will be described later in this application).

One mode of operating the novel architecture of FIG. 4 is in an optical power monitoring mode, in which the firmware may sequentially scan across a single pixel until it reaches the end range (as shown as "B" in the first pixel of FIG. 4) at which point the firmware controller would actively switch the optical signal to the second pixel and take control the second pixel, engaging in a controlled scan across its tuning range, processing any photodetector output that may be coupled to the pixel. The optical splitter may alternately be replaced with a passive splitter for applications where optical losses are less critical.

Fabrication

With respect to all embodiments, it is generally preferable that substrate 110 be comprised of glass but other substrate materials, including Garnet, silicon, polymers, etc., may be suitable depending on special pixel constructs and tailored tunable applications.

Figure 5:
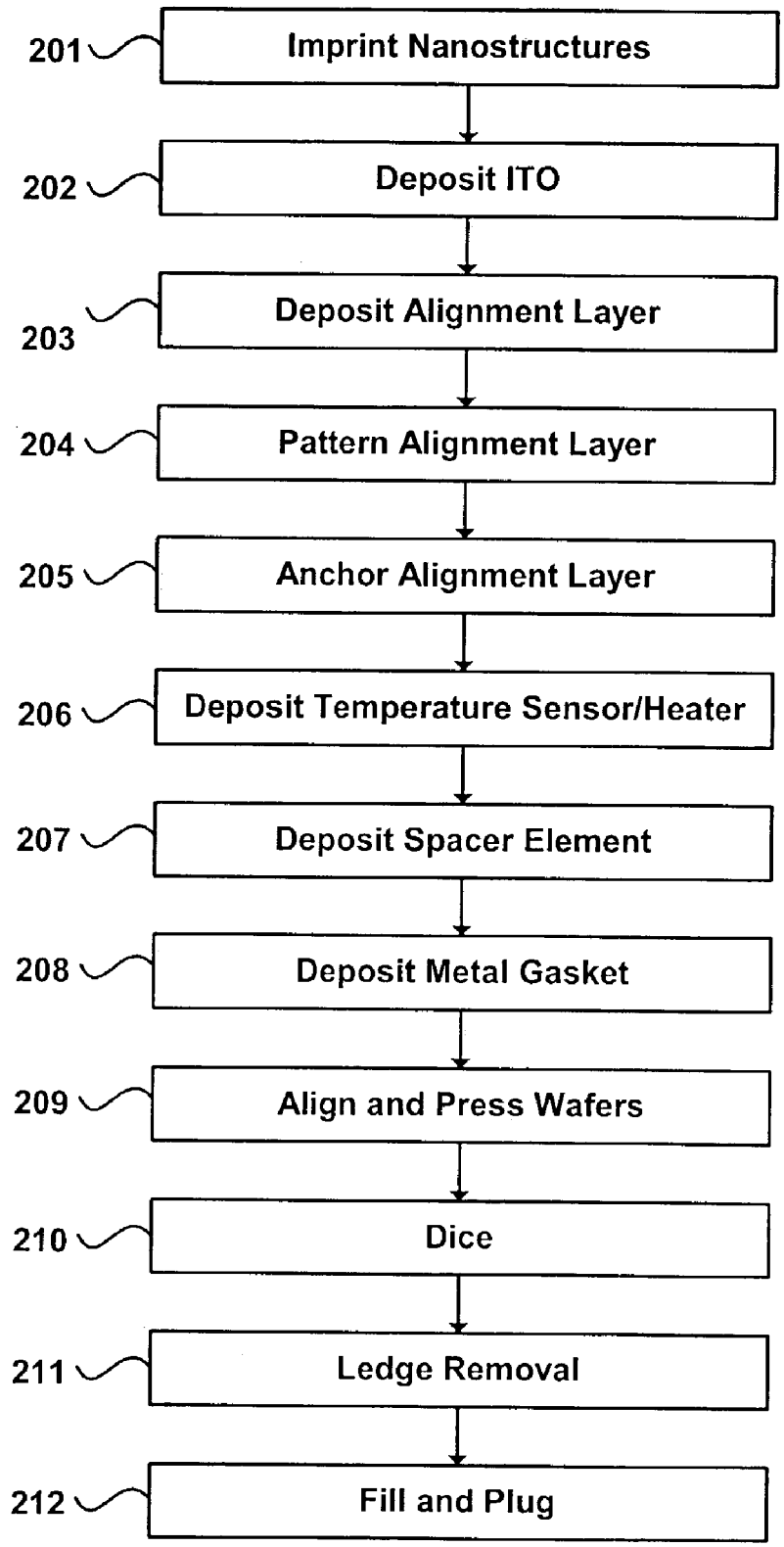
FIG. 5 shows one process flow for fabricating the tunable filter of the present invention.

FIG. 5 shows one example fabrication process to create the liquid crystal cell platform 100. Various optional steps may be omitted depending on the embodiment of configured features.

With respect to FIG. 5, step one involves integrating the optical elements and layer stacks into the first and second substrates. The optical elements may be formed by way of nano-imprint lithography techniques or similar methods known in the field and including those based on impressing a reference mask into photo resist to create surface relief patterns on the substrate where the surface relief photo resist pattern is etched to form grating features in the nanometer range. Preferably, the optical elements are deposited nano-structured gratings such as those available from NanoOpto Corporation of New Jersey who specifically offer the required optical elements, including the quarter wave reflector 111, polarization beam splitters/combiner 113 and the waveguide resonant grating 117.

In a multi-pixel application, the optical elements, including those referred to as 111, 112, 113 and 117 may be patterned and masked such that the specific optical functions are defined at referential pixel locations.

With respect to process step 201, the substrates are etched using nanoimprint lithography or similar methods known in the field and including those based on impressing a reference mask into photo resist to create surface relief patterns on the substrate where the surface relief photo resist pattern is etched to form grating features in the nanometer range. A uniform optical element mask may be used to pattern a global optical function across multiple pixels or the mask may be designed to provide local optical functions at referential pixel locations. The optical elements are preferably integrated into both surfaces of each substrate but they also may be supplied as a discreet chip and bonded to the target substrate by way of epoxy or other methods described herein or otherwise generally known. The deposition of a thin film photodetector optical elements 127 and 128 may be formed by way of iterative processes, including multiple deposition stages to apply the appropriate PIN diodes and based on amorphous, polycrystalline and microcrystalline materials for a completely absorbing photodetector, or silicon and germanium alloys for a partially transparent photodetector. Conductors for connecting to and contacting the photodetectors may be made from various transparent oxides, including zinc oxide, tin oxide and indium tin oxide.

Figure 6A:
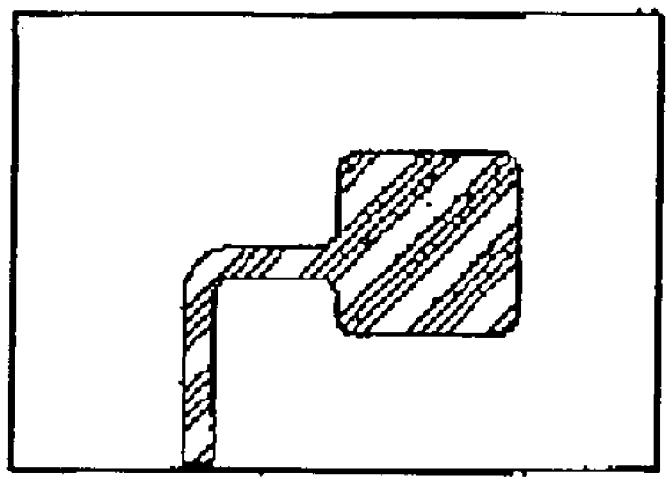
FIGS. 6A and 6B show four pixel indium tin oxide (ITO) electrode forming masks of the present invention.
Figure 6B:
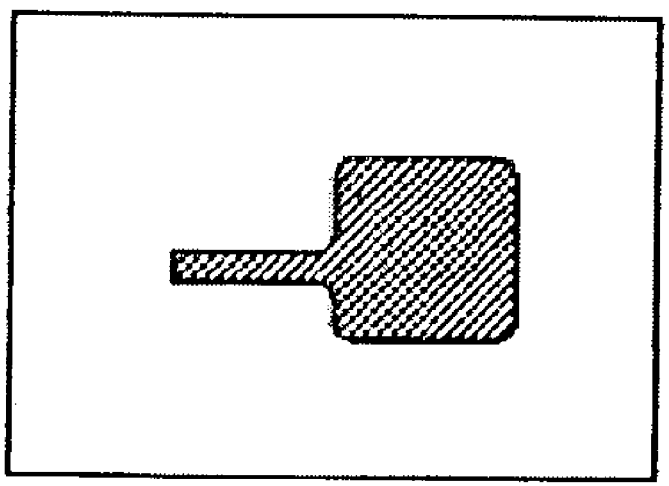

Step two involves adding the appropriate ITO (or other transparent conductive material) patterns to the first and second glass substrates to form the liquid crystal electrodes. With respect to process flow 202 of FIG. 5, a standard PECVD process may be used to apply thin film of ITO approximately 100 angstroms thick. FIGS. 6A and 6B show example ITO masks that may be used to pattern substrates 110A and 110B, respectively.

Step three involves adding a polyimide alignment layer to the second substrate 101B. With respect to process flow 203 of FIG. 5, standard spin coating stepped processes may be used at room temperature to create a layer of polyimide approximately 7000 angstroms thick on the second substrate.

Step four involves patterning the polyimide layer. With respect to process 204, photo resist may first be applied to substrate 101B and masked using traditional photolithography techniques or laser etching. Wet or dry etching performed thereafter may result in a pattern of polyimide.

Step five involves anchoring the liquid crystal alignment layer. With respect to process step 205, one traditional method is to rub the polyimide to form the alignment layers. In the electronically conductive birefringence (ECB) configuration of the present invention, the rubbing direction of the second substrate may be parallel to the equivalent homeotropic alignment provided by the grating waveguide filter 117. A first alternate method of forming the second substrate alignment layer is to an imprint lithography technique where a reference mask is pressed onto a deposited photo resist layer to create surface relief patterns in the photo resist which is subsequently etched to form high precision alignment grooves with nanoscale tolerance.

Steps three, four and five as mentioned above may be replaced by a second alternative method of the anchoring step and involves the use of a photo sensitive anchoring medium, such as Staralign by Vantio of Switzerland. The photosensitive anchoring medium may be spin applied to the substrate 110B and masked to achieve specific anchoring energy and direction. UV light masking of various patterns, including specific directional application may be used to form individual pixels. Pixels may be formed with different rub characteristics, depending on the tunable application.

Figure 7A:
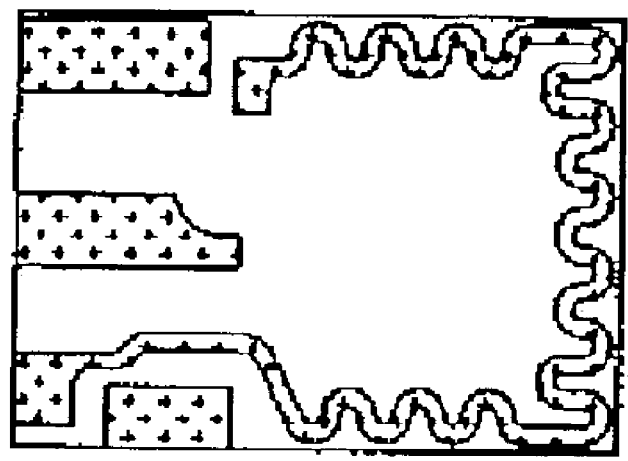
FIGS. 7A and 7B show example integrated active thermal element forming masks of the present invention.
Figure 7B:
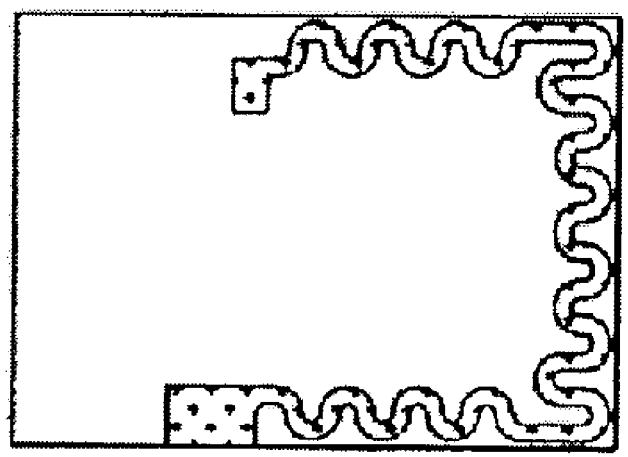

Optional step six involves creating the active thermal element, integrated heater and temperature sensor. FIGS. 7A and 7B show example masks that may be use with respect to process step 206 of FIG. 5, in which a seed adhesion layer of chrome is first deposited approximately 200 angstroms thick onto the substrates, followed by a PECVD deposition thin film platinum resistor layer approximately 2000 angstroms thick and forming the upper and lower portions of the integrated heater/temperature sensor. The upper and lower portions of the integrated device, applied to substrates 110A and 110B, may be separated by an air gap approximately 9.6 microns and interconnected by VIAS formed from a metal deposition step that will be described in succeeding step eight. Again, it need be stated that gap thickness is delineated for example purposes and will change depending on the desired application. It should be stated that, depending on the configuration, the platinum thin film resistor may be patterned in various shapes, including but not limited to arched, curved, circular, zigzag, stripped as well as the serpentine pattern of FIGS. 7A and 7B. Given the resistivity of the thin film platinum, approximately 10.6E-8 ohm meters, the example shown yields approximately 100 ohms resistance at room temperature.

Figure 8A:
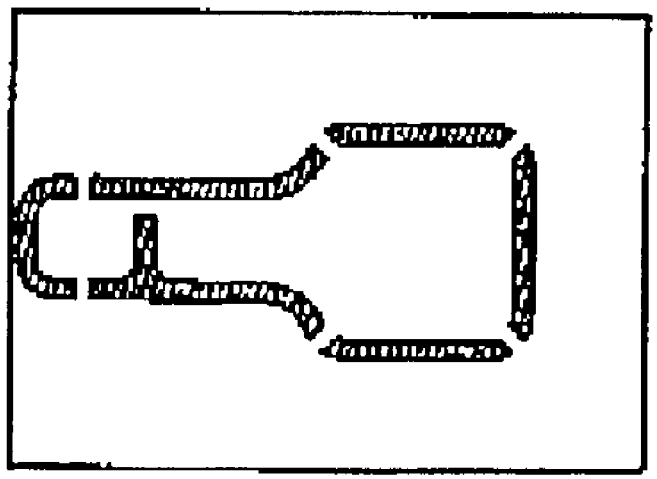
FIGS. 8A and 8B show example spacer element forming masks of the present invention
Figure 8B:
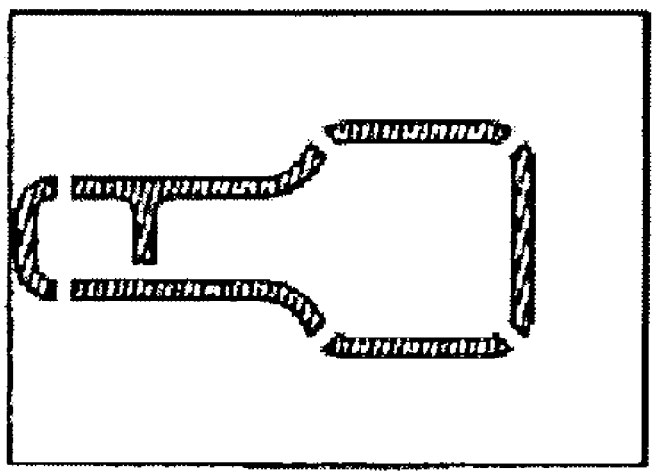

Step seven involves creating the spacer element 107. Spacer element 107 controls the gap thickness of the liquid crystal cell. While it is not necessary to equally distribute the spacer element equally on each substrate, it is preferred that one half of the desired gap thickness of the completed cell shall define the thickness of the spacer element 107 as deposited on each substrate. The combined cell 100 gap thickness may therefore be formed with a tolerance based on the deposition process. $AL_2O_3$ is the preferred material for creating the spacer element, however other materials such as silicon dioxide, aluminum oxide, silicon nitride, silicon monoxide and other materials compatible with thin film deposition processes that do not substantially compress may also be used as an alternative to the silicon dioxide provided they are compatible with the selected liquid crystal substrate material. FIGS. 8A and 8B show an example mask that may be used to perform the process step 207 of FIG. 5, where a patterned layer of 5 microns thick of silicon dioxide is deposited onto each substrate.

Figure 9A:
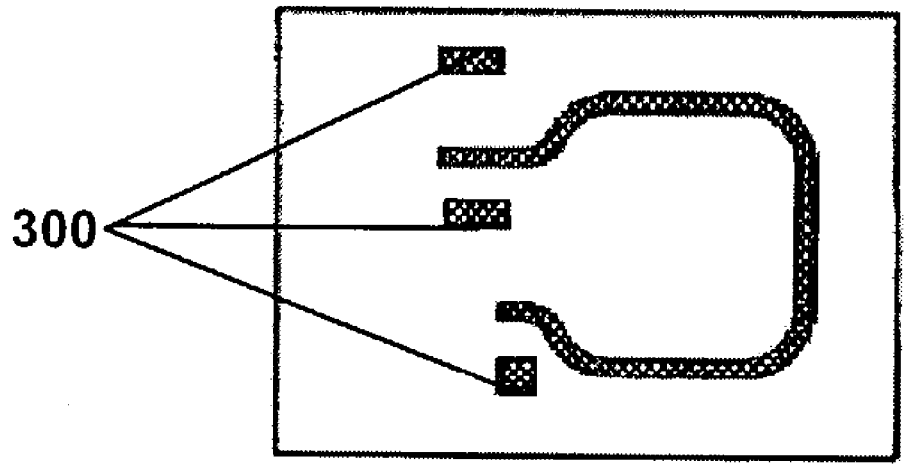
FIGS. 9A and 9B show example masks for defining a metal gasket element layer of the present invention.
Figure 9B:
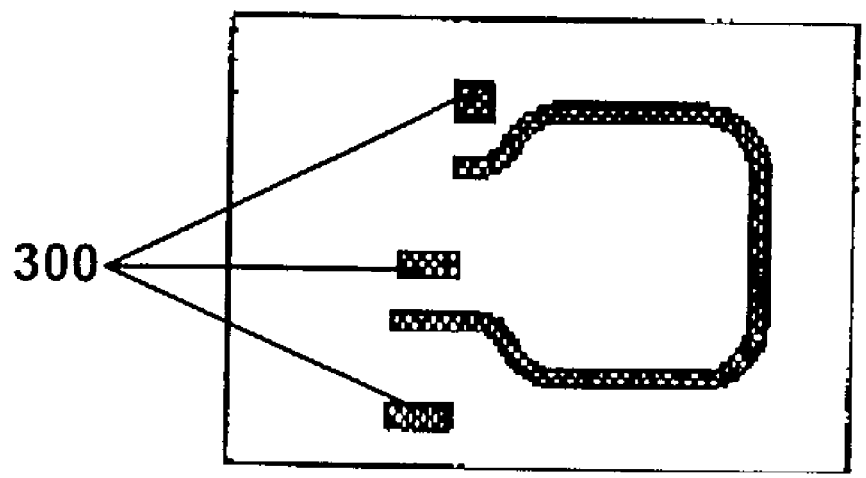

Step eight involves creating the metal gasket element 106. Metal gasket element 108 may be made from a variety of metals, including but not limited to, indium, gold, nickel, tin, chromium, platinum, tungsten, silver, bismuth, germanium and lead. However it is preferable to use a gold/tin composition because of its strength and melting temperature. FIGS. 9A and 9B show example masks that may be used to perform process step 208 of FIG. 5, where, for the continuing example purpose, a layer approximately 7 to 9 microns thick of indium may equally be deposited on each substrate. It is generally preferable that metal gasket layer of this process step is deposited thicker than the spacer element of the previous step due to seepage that occurs during the additional processing steps. Metal gasket masks, such as those shown in FIGS. 9A and 9B, may be configured to form referential VIAS 300 that enable electrical interconnection between features deposited on either substrate 110A or 110B. VIAS 300 may also be formed to simplify routing external contact pads to the temperature sensor and heating element. For example the VIAS 300 of the present example are positioned to overlap the heater/temperature sensor platinum layer defined in step six. They are also positioned to overlap the ITO layer so as to define contact pads to drive the two electrodes of the liquid crystal cell.

Step nine involves aligning and pressing wafers 110A together with 110B. It is known that visual alignment reference marks may be etched into the underlying wafer, or that a physical feature of the glass sheet such as an edge or alignment hole may be used to perform wafer alignment. However, a high yield method of accurately aligning the relative position of the two glass substrates without the need for expensive high precision alignment equipment is hereby presented, in which complimentary interlocking geometric features deposited on each substrate, mate with each other to prevent relative movement of the glass sheets during the bonding and pressing process. Such interlocking features mitigate any non uniformity in the bonding process and given that the typical gap between two glass sheets of a liquid crystal cell is less than 20 micrometers, thin film deposition or screening processes can be used to create precisely controlled and repeatable geometric features. With respect to process step 209 of FIG. 5, the substrates 110A and 110B may be brought together, aligned under pressure at room temperature to form a chemical bond metal gasket at the gap distance defined by the sandwich spacer elements formed from both substrates.

Step ten involves dicing of the wafers. Process step 210 of FIG. 5 may be performed using a dicing saw or via etching techniques.

Figure 10A:
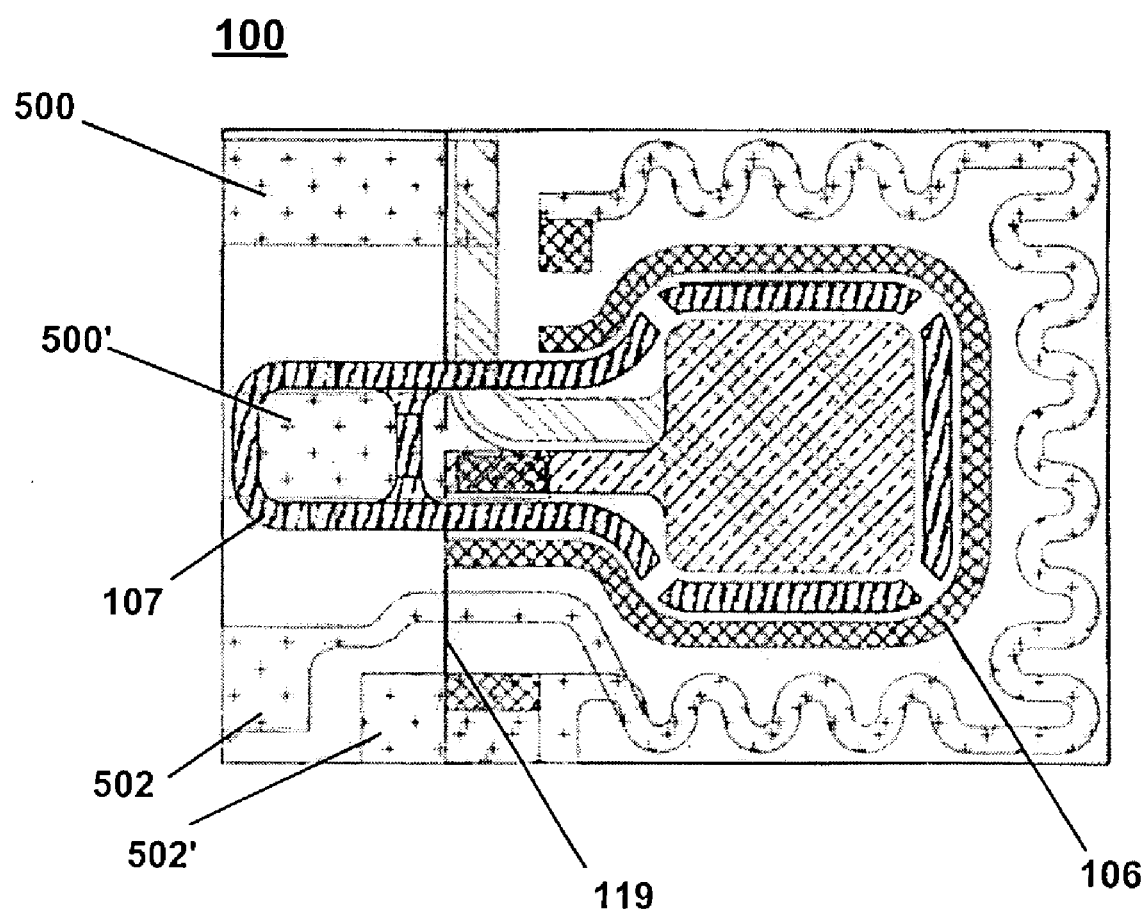
FIG. 10A shows an example top view integrated perspective showing the relationship between various layers of a one dimensional (1×N) array configuration of the present invention.
Figure 10B:
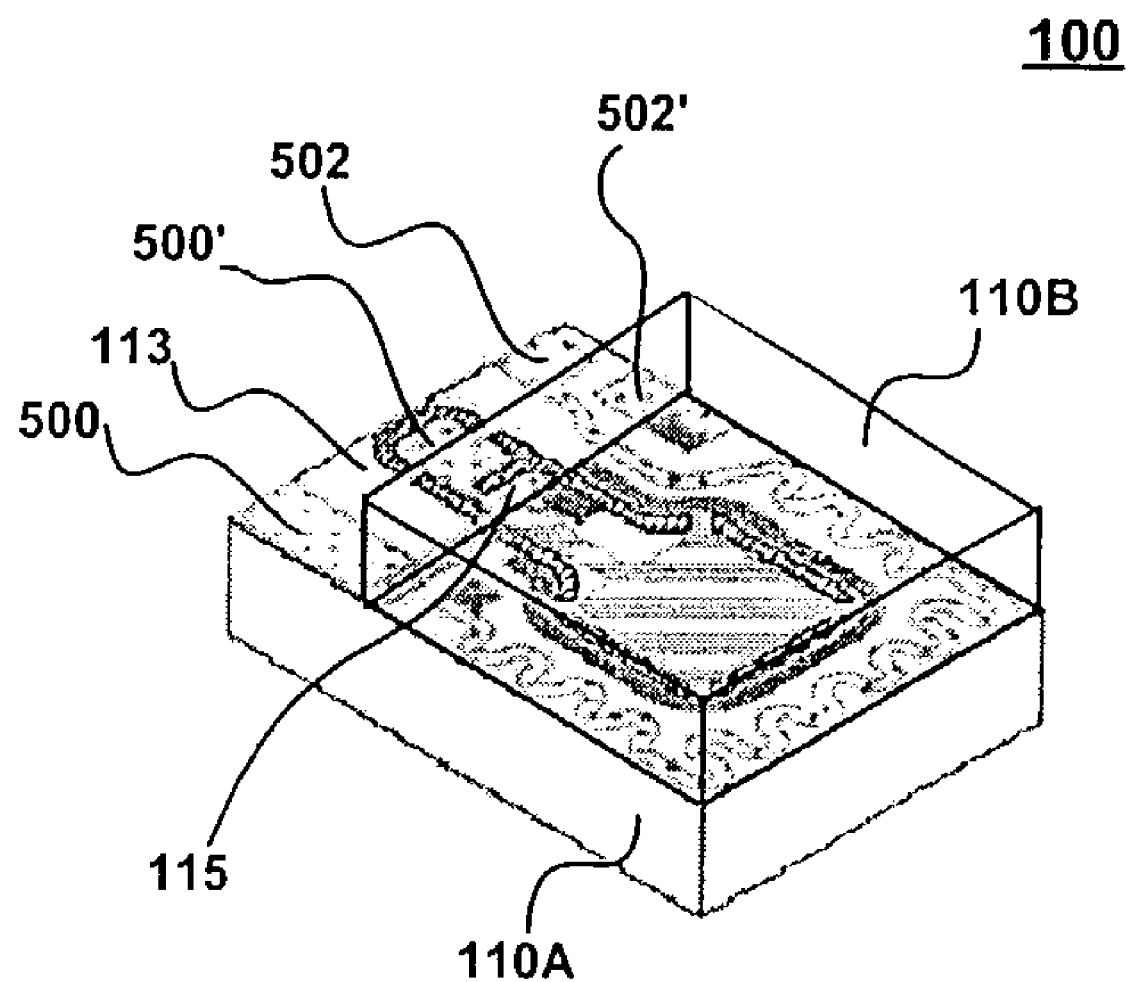
FIG. 10B is an isometric view showing a nine pixel (N×M) two dimensional liquid crystal cell at the termination of the fabrication process.

Step 11 involves removal of a portion of protective glass on the liquid crystal cell. FIG. 10A shows a top perspective of the various layers that combine through the substrates when interposed thereupon each other in a fully configured embodiment of the present invention. With respect to process 211 of FIG. 5, the substrate 110B is scored using a diamond dicing saw to cut a trench approximately 90% through the thickness of the substrate and forming the break off line 119 of FIG. 10A. A portion of the substrate 110B is broken off along the break off line 119 to define an access surface 113 of FIG. 10B that provides access to the underlying liquid crystal electrode contact pads 500 and 500', the underlying liquid crystal heater/temperature sensor element electrical contact pads 502 and 502', as well as to the liquid crystal fill port 115.

Step 12 involves filling the liquid crystal device with a liquid crystal molecules, process 212 of FIG. 5. This step may be performed using traditional methods of filling a liquid crystal cell, whereby the cell is placed in a vacuum, a droplet size of liquid crystal material is placed at the fill port 115, and with the release of the vacuum, equilibrium pressure forces the liquid crystal material into the fill port 115 and the fill port is plugged. Several techniques to cap the fill port, including UV curable epoxy which may be used to close the fill port.

The present invention includes various liquid crystal configurations designed to function in a variety of specific optical systems and applications. More specifically, the tunable filter may be tailored for specific optical applications, including, but not limited to spectroscopy and optical power monitoring applications.

Thermal Management

Figure 11:
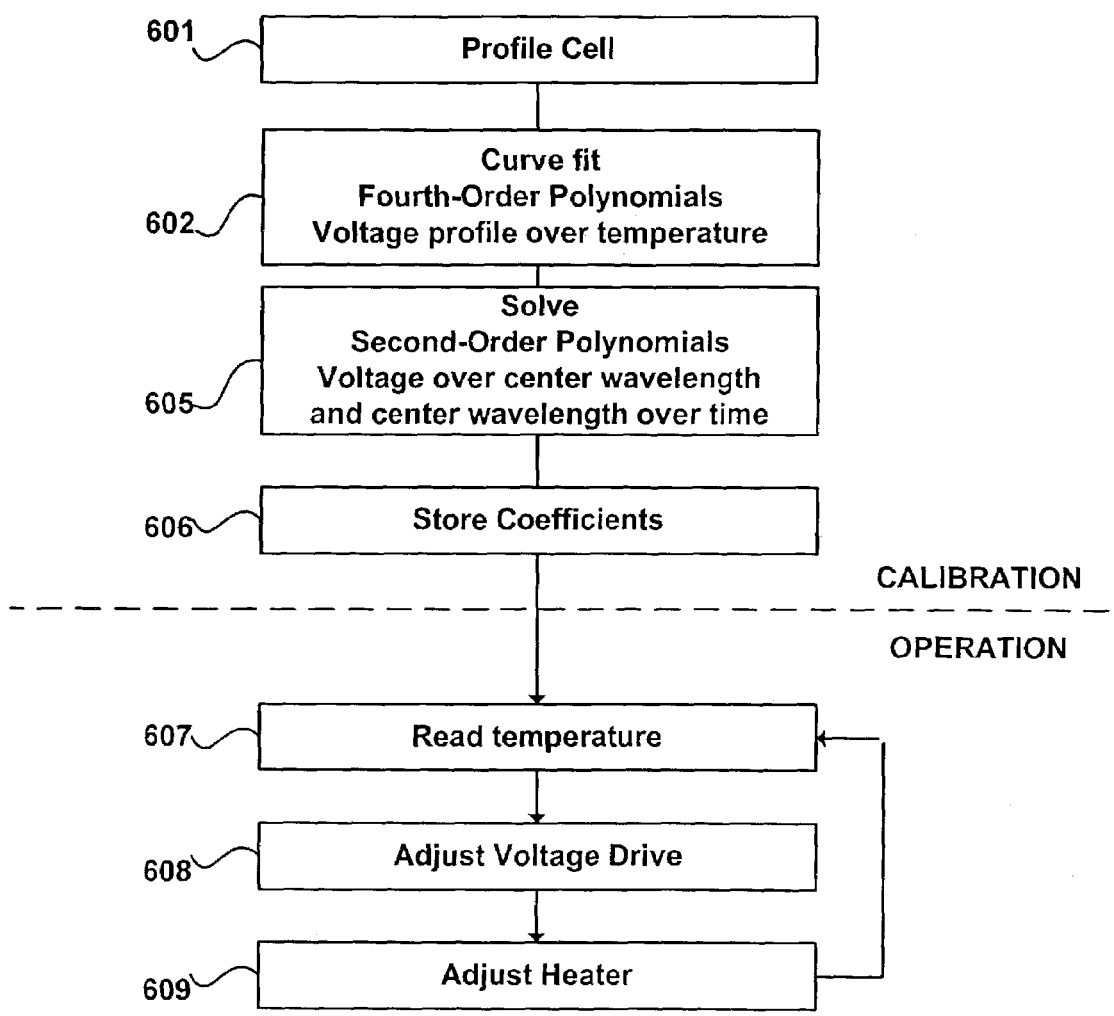
FIG. 11 shows the liquid crystal thermal calibration and feedback loop method flows.
Figure 12:
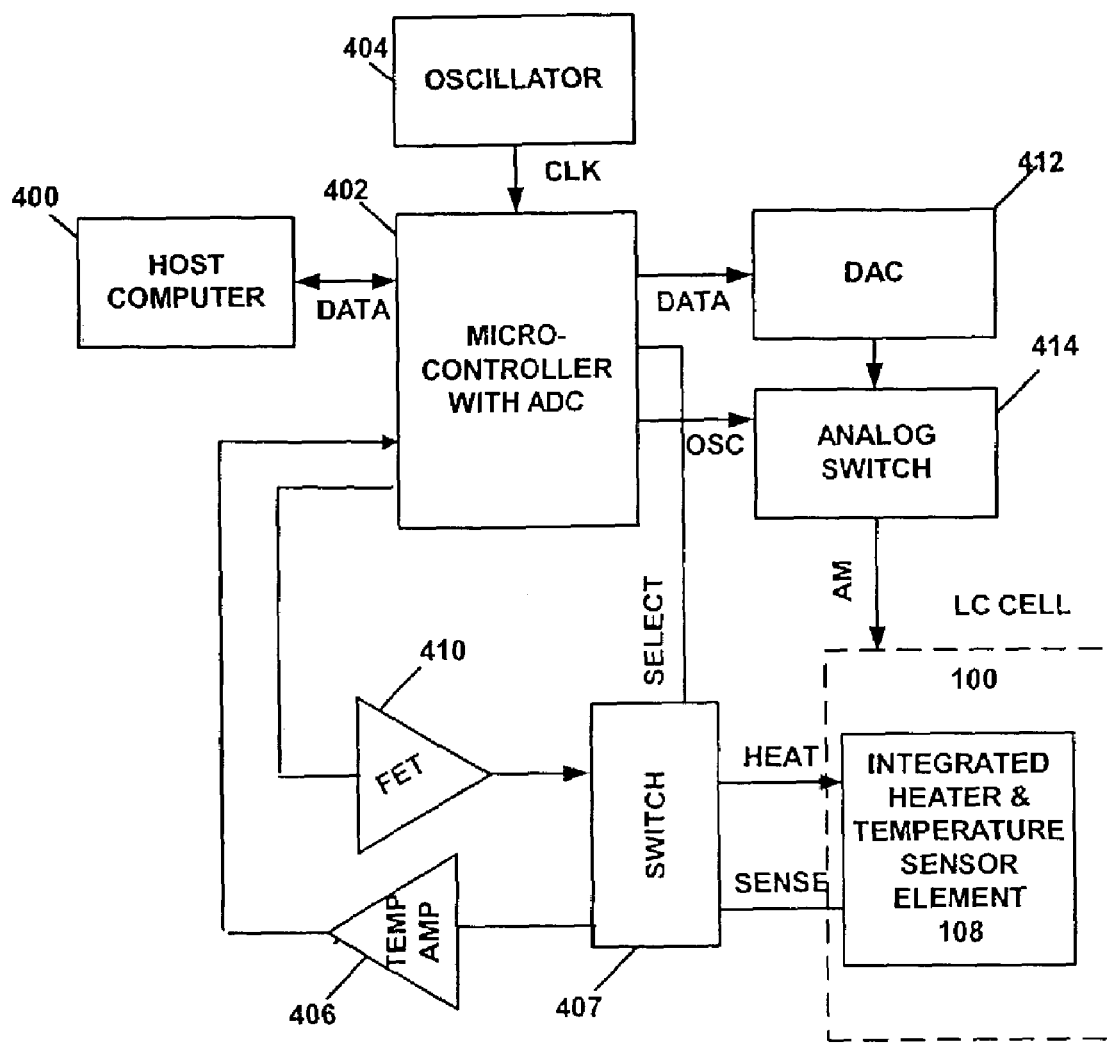
FIG. 12 shows a block system diagram for the electronic control and thermal management system of the present invention.

Any non-linearity in changing the center wavelength of the filter may be algorithmically compensated using a slightly modified thermal calibration and operating processes of the present invention in which a three dimensional curve fit is used to model a parameter space including either wavelength versus voltage and temperature or wavelength versus switching time transition and temperature. This modification will be evident upon review of the thermal compensation calibration and operating loop now described:

A block diagram of the control system and components directed to a liquid crystal tunable filter are included in FIGS. 11 and 12 along with the liquid crystal thermal management and voltage controller subsystems of the present invention, now described in further detail.

In one example configuration, host computer 400 may be configured to communicate with microcontroller 402 over a full duplex data interface and enabling the host computer to engage functions, send commands and retrieve data from microcontroller 402. Microcontroller may be configured to store software control routines. The software control routines may function to adjust voltage drive provided to each pixel in the liquid crystal cell in response to temperature fluctuations.

The microcontroller may utilize a time division multiplexing scheme that multiplexes temperature sensing and heating functions in the integrated sensor/heater device such that the cell may generally be kept at a constant temperature. Alternately, a calibration process characterizes the profile of the cell and generates a polynomial regression formula that provides the optimal voltage drive output for given temperature and cell state inputs. The microcontroller 402 stores the state of the liquid crystal cell, the regression formula, and reads the temperature of the liquid crystal cell to compute and assert the temperature compensated voltage drive.

FIG. 11 shows a calibration process that may be used to perform the method of the present invention in which a liquid crystal cell thermal operating characteristic profile is translated into deterministic coefficients assembled into a stored regression formula used to adjust the voltage drive to the cell in response to temperature and cell state.

The first step to determine the coefficient values in the cell's temperature and voltage compensation profile, is to profile the liquid crystal cell drive characteristics across a range of temperatures. The profile process step 601 may examine a light source passing through the cell and its center wavelength at a given voltage and temperature combination. An operational liquid crystal cell is placed in a thermal chamber programmed to change operating temperature across the desired temperature range at a given interval. At every temperature change interval, a range of voltages are provided to the liquid crystal cell while a performance characteristic, such as center wavelength, is measured. Voltage is scanned until to achieve maximum spectra range, at which point the voltage, center wavelength and temperature levels are stored as a grid reference in a cell profile definition table. The performance of the liquid crystal cell is recorded at grid point center wavelength and temperature levels, resulting in a multi dimensional lookup table whereby any temperature and voltage input provides an center wavelength level output. This table may be represented as a three dimensional surface.

In addition, the power versus time profile is measured at each temperature as the voltage is scanned from maximum to minimum, and visa versa.

The second step requires processing the lookup table to smooth the voltage profile over temperature and the time profile over temperature at the given center wavelength levels as recorded in the previous step. A statistical program capable of performing regression analysis, such as Mathematica® may be used to perform this process step 602. The regression software is provided with the look up table generated in step one, and performs a fourth order regression curve fitting process that generates for each center wavelength level, the appropriate coefficients a,b,c,d, and e representing a voltage versus temperature or time versus temperature profile of the cell at each center wavelength level, represented by the following formula, $$v = a + bT + cT^2 + dT^3 + eT^4$$

$$v_1 = a_1 + b_1T + c_1T^2 + d_1T^3 + e_1T^4$$

$$v_2 = a_2 + b_2T + c_2T^2 + d_2T^3 + e_2T^4$$

.
.
.

$$v_n = a_n + b_nT + c_nT^2 + d_nT^3 + e_nT^4$$

where V=voltage, T=liquid crystal cell temperature, a,b,c,d,e=curve fit coefficients, and n=attenuation level.

The same fit of voltage verses temperature is now repeated with response time versus temperature. Response time is initiated by voltage application or removal. This is performed using the same polynomials as above but the voltage variable will be replaced with time.

Given that smooth curves result from the prior step that define the optimal voltage drive level and time from switching for a given temperature at the recorded grid center wavelength level, step three results in smooth curve regressions fit across orthogonal axis of the three dimensional surface, whereby the smooth curves are fit over the coarse center wavelength grid recorded in step 1. In this third process step 603, the five coefficients of the previous step are each solved by a second order regression. Specifically, Mathematica® or any suitable program is used to solve for the three coefficients that fit the profile of each of the five coefficients a,b,c,d and e across all of the orders of the regression $v_n = a_n + b_nT + c_nT^2 + d_nT^3 + e_nT^4$ (as previously stated, substitute voltage with time for the alternate calibration method). So, a smooth surface profile defines the optimum voltage compensation level given an input center wavelength state and temperature by the following formula $$v = a + bT + cT^2 + dT^3 + eT^4, \text{ where,}$$

$$a = (X + Y\theta + Z\theta^2)$$

$$b = (X_1 + Y_1\theta + Z_1\theta^2)$$

$$c = (X_2 + Y_2\theta + Z_2\theta^2)$$

$$d = (X_3 + Y_3\theta + Z_3\theta^2)$$

$$e = (X_4 + Y_4\theta + Z_4\theta^2)$$

Theta=liquid crystal center wavelength
X,Y,Z =solution to zero order coefficient
$X_1$, $Y_1$, $Z_1$=solutions to first order coefficient
$X_2$, $Y_2$, $Z_2$=solutions to second order coefficient
$X_3$, $Y_3$, $Z_3$=solutions to third order coefficient
$X_4$, $Y_4$, $Z_4$=solutions to fourth order coefficient The fifteen coefficient solutions (Xn,Yn,Zn) where n=0 to 4, may be generated by Mathematica, using the Fit(data, {1, x, x^2, . . . , x^n}, x) function or other suitable software packages capable of performing curve fitting regression.

Step four is the final step in the calibration process of FIG. 11, process 606, and results in storing the coefficients in the liquid crystal control system which is now described.

The coefficients that profile the liquid crystal characteristics may be stored in microcontroller 402 memory (FIG. 12) by flashing the memory of the microcontroller with the appropriate 15 coefficient values.

Depending on response and accuracy requirements for the application, the thermal compensation system of the present invention could operate by reading the temperature of the liquid crystal cell and adjusting the voltage drive of the cell based on the cell state. The cell state may typically be at any center wavelength in the spectral range. The cell state may be stored in the microcontroller 402 and also be configured via the host computer 400.

Alternately, when a full spectral measurement is needed, voltage can be applied directly from minimum to maximum and the temperature calibration is used to correlate center wavelength versus time.

Microcontroller may be a PIC microchip having an internal analog digital converter and operating with a 10 Mhz crystal oscillator 404 clock. The microcontroller may be programmed to cycle through all pixels in the cell to controllably apply voltage to each pixel. The microcontroller may be connected to a multi-channel digital analog converter (DAC) configured to provide an output voltage level in response to a configuration pulse stream from the microcontroller over a serial interface. The output of the DAC connects to the input of an analog switch array having switching element 414$^n$ associated with each pixel in the cell. Each element in the switch array 414 preferably shares a 1.2 khz clock provided by an output port pin of the microcontroller.

Other drive frequencies may be used to actuate the liquid crystal material. In addition, A frequency modulated drive may be incorporated into the platform to replace the amplitude modulated voltage drive. Such FM drive may also be optimized using the same methodology as described later in the thermal compensation calibration and operation loops.

With respect to the continuing example and for any given pixel, DATA is passed to the DAC along with a SELECT pulse train encoding the appropriate voltage amplitude at the Nth output channel. A WR command sent to the DAC causes the DAC output to be received at the input of the Nth analog switch 414$^n$, triggering the application of an AM transmission over a 1.2 khz carrier to be applied to the appropriate liquid crystal cell electrode 500$^N$. As the microcontroller cycles through each iteration of the process steps described above, N is incremented and the voltage is applied the next pixel in the system.

A temperature sensor reading may be provided by the internal integrated heater/temperature sensor from an external device. One of the heater/temperature sensor electrodes 502 or 502' of the liquid crystal cell 100 may be grounded while the other may connect to switch 407. Switch 407 may selectively engage the integrated heater/temperature sensor element 108 in a sense or heat mode. More specifically, switch 407 may be configured ON to connect the ungrounded heater/temperature electrode through instrumentation amplifier 406 to an ADC coupled to the microcontroller which reads the temperature on the liquid crystal cell, or it may be configured OFF so that power amplifier FET 410, which may be controlled by a pulse train from microcontroller 402 and applies a voltage potential to operate the device 108 as a heater.

In a temperature sense feedback closed loop operation, which shall hereby be referred to as the loop embraced by process steps 607 through 609 of FIG. 11, the microcontroller reads the temperature of the liquid crystal cell and calculates the voltage drive based on the sensed temperature, T, and the current state of each pixel, Theta. The fifteen coefficients are plugged back into the fourth order regression formula to establish a smooth surface profile delineating an optimal voltage to supply to the pixel for a given temperature and pixel center wavelength:

$v = (X + Y\theta + Z\theta^2) +$ $(X_1 + Y_1\theta + Z_1\theta^2)T +$ $(X_2 + Y_2\theta + Z_2\theta^2)T^2 +$ $(X_3 + Y_3\theta + Z_3\theta^2)T^3 +$ $(X_4 + Y_4\theta + Z_4\theta^2)T^4$ The new voltage value V is stored in the microcontroller for transmission to the DAC 412 during the next voltage application cycle.

The time calibration method is applicable to all of the above steps where, again, time is the variable replacing voltage.

The liquid crystal cell may also be maintained about a reference temperature. Process step 609 with respect to FIG. 11 involves the application of heat to maintain the temperature of the liquid crystal cell about a reference temperature. The reference temperature may be above the ambient room temperature or above the temperature of any carrier device that may be coupled to the liquid crystal cell. The selection of a reference temperature above the ambient temperature will result in the tendency of the liquid crystal cell to cool to meet the ambient temperature after the application of a heat burst. A counter thermal bias is therefore generated to support temperature stability about the reference temperature.

Microcontroller memory may store the reference temperature, the value of the current temperature, historical temperatures, and, historical levels of heat applied to the liquid crystal cell. The value of the sensed temperature T at every instance may be compared against the reference temperature to determine the amount of heat to apply to the liquid crystal cell. An 8 bit analog digital converter will provide approximately ⅓ of a degree of temperature sensing resolution over the desired temperature range, so the example system may provide for temperature stability about a reference temperature to within ⅓ degree Celsius. At every instance of process step 609, a threshold detector routine stored in microcontroller ROM may trigger a control function if the sensed temperature of the liquid crystal cell falls below the desired operating reference temperature. The control function may determine how much heat to apply to the liquid crystal cell. The control function may utilize error minimizing routines that track the change in temperature across multiple instances of process step 609. The error correcting routines may store the previous temperature reading T0 along with the previous amount of heat applied to the liquid crystal cell H0. The temperature reading and every succeeding temperature reading T1 may be compared against T0 to determine the amount of temperature change resulting from the previous heating of the liquid crystal cell. Heat may be applied to the liquid crystal cell by way of the FET power driver as described above. The heater may be triggered at a fixed or variable duty cycle and controlled using frequency or amplitude modulation.

Although the present invention has been fully described by way of description and accompanying drawings, it is to be noted that various changes and modifications will be apparent to those skilled in the art. For example, the polarization beam splitting element 113 and the conductive electrode 104 can be applied in reverse order such that the conductive electrode 104 is directly adjacent to the substrate and the polarization beam splitting element is directly a top thereof. Various patterns may be used to form the spacer element, metal gasket and integrated heater/temperature sensor elements of the multi-pixel cell platform. Use of external temperature sensors and heaters in part or whole may be applied using the temperature compensation methods and regression of the present invention. The conductive electrode layer 104 may be transparent or reflective, depending on the application and pixel type. The metal gasket may be modulated to provide heating function in addition to its function as a moisture barrier support membrane. Epoxy gaskets may be used in combination with metal gasket elements in part or whole, and the metal gasket elements may comprise a single solder cap. Anchoring and aligning the liquid crystal material in a cell may also be performed using photo alignment material, Staralign by Vantio of Switzerland or other known alignment methods, including laser etching. Anchoring the liquid crystal material in the cell (described hereunder as step five) may be performed before patterning of the polyimide (described hereunder as step four). The process steps for the closed loop temperature feedback may also be rearranged such that the heating process is performed prior to applying the voltage drive. The order of fitting voltage with each dimension of the three dimensional surface is reversible and other three dimensional surface fitting algorithms may be used, including but not limited to those that describe a surface with one dimension fitting a fourth degree polynomial and the other dimension fitting a second degree polynomial. Amplitude or frequency modulation may be used to tune the liquid crystal tunable filter. It is well within the scope of the present invention to make modifications to the electrode masks to produce any size array of liquid crystal cells in any first, second or third dimension. Finally, it is well within the scope of the present invention to change the electrode masks accordingly to modify the shape of each pixel.

Therefore, it is to be noted that various changes and modifications from those abstractions defined herein, unless otherwise stated or departing from the scope of the present invention, should be construed as being included therein and captured hereunder with respect to the claims.

What is claimed is:

1. A polarization independent tunable filter comprising:
   a liquid crystal cell comprised of a first and second substrate, said first substrate includes a first surface having a rotating mirror and a second surface including a polarization beam splitter and waveguide resonant grating filter, said second substrate having a second surface including a rotating mirror and a first surface having a polarization beam splitter, said substrates being mutually disposed such that the second surface of the first substrate faces the first surface of the second substrate.

2. The tunable filter of claim 1, further including liquid crystals coupled between the first and second substrates.

3. The tunable filter of claim 2, further including an electrode layer positioned adjacent to the polarization beam splitters on both the first and second substrates.

4. The tunable filter of claim 3, further including an anchoring layer positioned adjacent to the electrode and polarization beam splitters on the second substrate and distal to said second substrate.

5. The tunable filter of claim 4, wherein the application of voltage applied across the electrode layers results in tuning of the tunable filter.

6. The tunable filter of claim 5, wherein the waveguide resonant grating filter is comprised of a grating, a core and a cladding.

7. The tunable filter of claim 6, wherein the waveguide resonant grating filter is made of silicon nitride and silicon dioxide.

8. The tunable filter of claim 7, wherein the waveguide resonant grating filter grating has a period between 200 and 900 nanometers.

9. The tunable filter of claim 1, wherein said tunable filter has an optical aperture, and the rotating mirror on the first substrate is positioned in the aperture but does not impede an input passing into the tunable filter or an output beam reflected therefrom.

10. The tunable filter of claim 9, wherein the waveguide resonant grating filter has a waveguide index of refraction between 2.3 and 3.05.

11. A polarization independent tunable filter comprising:
    a liquid crystal cell comprised of a first and second substrate, said first substrate including a first surface having a rotating mirror and a first photodetector, and a second surface including polarization beam splitter, electrode, anchor and waveguide resonant grating filter layers, said second substrate having a second surface including a second photodetector and a first surface having electrode and anchor layers,
    wherein the second surface of the first substrate faces the first surface of the second substrate.

12. The tunable filter of claim 11, wherein both photodetectors are nontransparent.

13. The tunable filter of claim 11, wherein said tunable filter has an optical aperture, and the rotating mirror on the first substrate is positioned in the aperture but does not impede an input passing into the tunable filter or an output beam reflected therefrom.

14. The tunable filter of claim 11, further including a metal gasket layer and a spacer layer positioned between the first and second substrates.

15. The tunable filter of claim 12, wherein the photodetectors are partially transparent and act as taps to signals output from the tunable filter.

16. The tunable filter of claim 12, wherein the one of said first and second photodetectors completely absorbs a signal output from the tunable filter.

17. The tunable filter of claim 14, further including a heater/temperature sensor element.

18. The tunable filter of claim 14, wherein the metal gasket is comprised of gold and tin.

19. The tunable filter of claim 17, wherein the heater/temperature sensor element is a resistive thermal device.

20. A polarization independent tunable filter comprising:
    a first liquid crystal tuning pixel comprised of a first and second substrate, said first substrate including a first surface having a rotating mirror and a second surface including polarization beam splitter, electrode, anchor and waveguide resonant grating filter layers, said second substrate having a second surface including a rotating mirror and a first surface having polarization beam splitter, electrode and anchor layers, said substrates being disposed such that the second surface of the first substrate faces the first surface of the second substrate, and wherein said tunable filter has an optical aperture, and the rotating mirror on the first substrate is positioned in the aperture but does not impede an input passing into the tunable filter.

21. The tunable filter of claim 20, further including a second liquid crystal tuning pixel having a tuning range that partially overlaps the tuning range of the first liquid crystal tuning pixel.

22. The tunable filter of claim 21, further incuding an 1.times.2 optical splitter for routing a single input beam to both of the tunable filter pixels.

23. The tunable filter of claim 22, further including a photodetector positioned at an output of at least one pixel.

* * * * *